(12) United States Patent  
Moon et al.

(10) Patent No.: US 6,882,386 B2  
(45) Date of Patent: Apr. 19, 2005

(54) CHOLESTERIC LIQUID CRYSTAL (CLC) DISPLAY DEVICE AND METHOD FOR MANUFACTURING THE SAME

(75) Inventors: Jong-Weon Moon, Anyang-si (KR); Ji-Yong Kim, Gyeonggi-do (KR); Sunghoe Yoon, Anyang-si (KR); Hee-Nam Hwang, Gunpo-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/321,626

(22) Filed: Dec. 18, 2002

(65) Prior Publication Data

US 2003/0112392 A1 Jun. 19, 2003

(30) Foreign Application Priority Data

Dec. 19, 2001 (KR) ................. 10-2001-0081360

(51) Int. Cl.$^7$ ................................. G02F 1/13
(52) U.S. Cl. ........................... 349/98; 349/112
(58) Field of Search ................. 349/106, 115, 349/112, 98

(56) References Cited

U.S. PATENT DOCUMENTS

| | | | | |
|---|---|---|---|---|
| 3,592,527 A | * | 7/1971 | Conners et al. ............. | 349/29 |
| 3,756,694 A | * | 9/1973 | Soree et al. ............... | 349/182 |
| 3,942,007 A | * | 3/1976 | Saeva ...................... | 250/331 |
| 3,957,346 A | * | 5/1976 | Saeva ...................... | 349/98 |
| 3,960,438 A | * | 6/1976 | Bonne ..................... | 349/96 |
| 4,025,161 A | * | 5/1977 | La Roche .................. | 349/98 |
| 4,883,343 A | * | 11/1989 | Teshirogi ................... | 349/137 |
| 5,706,065 A | * | 1/1998 | Yano ....................... | 349/112 |
| 5,724,111 A | * | 3/1998 | Mizobata et al. ........... | 349/112 |
| 5,822,029 A | * | 10/1998 | Davis et al. ............... | 349/115 |
| 6,177,216 B1 | * | 1/2001 | Broer et al. ................ | 430/7 |
| 6,266,112 B1 | * | 7/2001 | Mizobata et al. ........... | 349/113 |
| 6,300,990 B1 | * | 10/2001 | Yamaguchi et al. ......... | 349/112 |
| 6,348,995 B1 | * | 2/2002 | Hansen et al. .............. | 359/486 |
| 6,667,788 B1 | * | 12/2003 | Maruyama et al. .......... | 349/115 |

FOREIGN PATENT DOCUMENTS

| | | |
|---|---|---|
| KR | 1999-0033039 | 5/1999 |
| KR | 2000-013612 | 3/2000 |
| KR | 2000-001104 | 1/2001 |

* cited by examiner

Primary Examiner—James A. Dudek  
(74) Attorney, Agent, or Firm—McKenna Long & Aldridge LLP (57) ABSTRACT

A liquid crystal display device having a cholesteric liquid crystal (CLC) color filter comprises a first substrate, a circular polarizer on the first substrate, a cholesteric liquid crystal (CLC) color filter on the circular polarizer, a first electrode on the cholesteric liquid crystal (CLC) color filter, a second substrate spaced apart from the first substrate, a second electrode beneath the second substrate, a liquid crystal layer between the first and second electrodes, a back light under the first substrate, a diffusive film on the second substrate, a retardation layer on the diffusive film, and a linear polarizer on the retardation layer.

29 Claims, 6 Drawing Sheets

CHOLESTERIC LIQUID CRYSTAL (CLC) DISPLAY DEVICE AND METHOD FOR MANUFACTURING THE SAME

This application claims the benefit of Korean Patent Application No. 2001-81360, filed on Dec. 19, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a cholesteric liquid crystal (CLC) display device and a method for manufacturing the same in which a circular polarizer is formed in an interior of a liquid crystal cell resulting in a decrease of a thickness of the cholesteric liquid crystal (CLC) display device and reduced light leakage.

2. Discussion of the Related Art

As the information age has rapidly evolved, the need for flat panel displays, which have advantages such as thinness, light weight and lower power consumption, has increased. Liquid crystal display (LCD) devices have been applied to notebook computers, desktop monitors, etc., because of their superiority in resolution, display of color images and displaying quality.

Generally, the liquid crystal display device has upper and lower substrates, which are spaced apart and face each other. Each of the substrates includes an electrode, and the electrodes of each substrate face each other. Liquid crystal is interposed between the upper substrate and the lower substrate. Voltage is applied to the liquid crystal through the electrodes of each substrate, and thus alignment of the liquid crystal molecules is changed according to the applied voltage to display images. Because the liquid crystal display (LCD) device has polarizers that transmit only light of a particular direction on an outer side of both substrates, a gray scale of transmitted light can be controlled. Because the liquid crystal display device cannot emit light by itself, it needs an additional light source to display images. Accordingly, the liquid crystal display device has a back light as a light source behind a liquid crystal (LC) panel. The amount of light transmitted from the back light through the LC panel is controlled according to the alignment of the liquid crystal molecules in the LC panel to display images. The electrodes of each substrate are formed of transparent conductive material, and the substrates must be transparent. However, the polarizer of this liquid crystal display (LCD) device transmits light of certain direction but absorbs light of other direction. The absorbed light is lost as heat, etc., and thus a luminance loss of over 50% is induced considering a reflection on a surface of the polarizer. Accordingly, the liquid crystal display (LCD) device having a reflective circular polarizer has been suggested in order to increase the luminance by reducing the luminance loss. The reflective circular polarizer transmits a certain circularly polarized component of an incident light and reflects the other circularly polarized component of the incident light. The reflected circularly polarized component is reflected again while it passes through many optical elements under the circular polarizer, and a direction of the reflected circularly polarized component is changed so that it can be transmitted through the circular polarizer. That is, because a whole amount of the incident light can theoretically be transmitted through the circular polarizer, the loss of the incident light can be greatly reduced compared with the liquid crystal display (LCD) device having only an absorptive linear polarizer. Besides, the cholesteric liquid crystal (CLC) display device, which has a cholesteric liquid crystal (CLC) color filter and the circular polarizer, has been researched and developed. Because the cholesteric liquid crystal (CLC) has a selective reflection property, the luminance can be improved compared with the liquid crystal display (LCD) device having an absorptive color filter. A structure of a related art cholesteric liquid crystal (CLC) display device will be described hereinafter with reference to attached figures.

Figure 1:
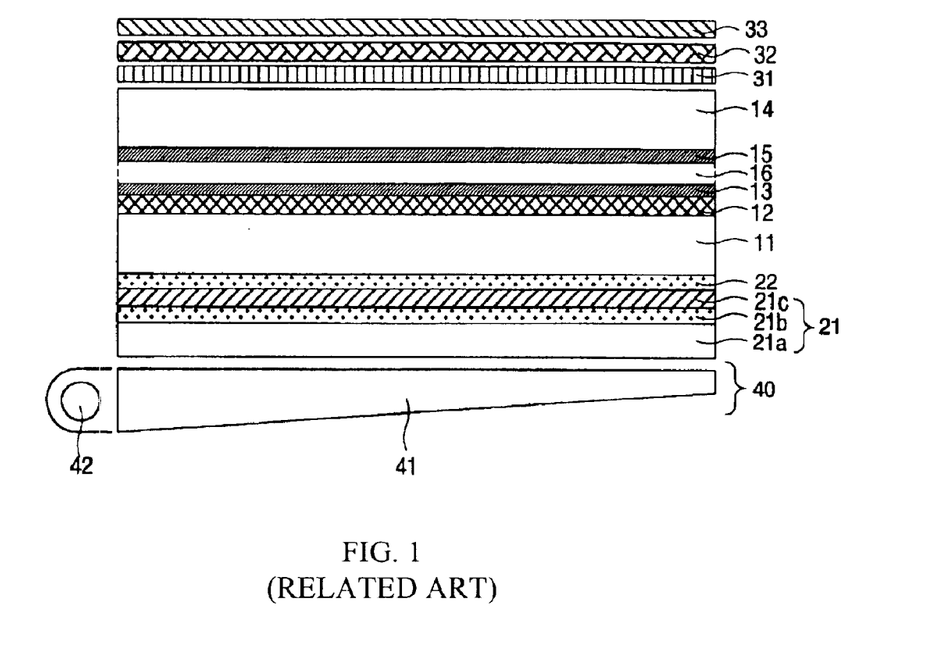
FIG. 1 is a cross-sectional view of a related art cholesteric liquid crystal (CLC) display device.

FIG. 1 is a cross-sectional view of a related art cholesteric liquid crystal (CLC) display device. The cholesteric liquid crystal (CLC) display device has a transparent first substrate 11 and a transparent second substrate 14 that are spaced apart and facing each other. A cholesteric liquid crystal (CLC) color filter 12 is formed on the first substrate 11. A first electrode 13 is formed on the cholesteric liquid crystal (CLC) color filter 12 and a second electrode 15 is formed beneath the second substrate 14. A liquid crystal layer 16 is disposed between the first and second electrodes 13 and 15. The first and second substrates 11 and 14, other layers therebetween and the liquid crystal layer 16 form a liquid crystal cell. A circular polarizer 21, which is formed of cholesteric liquid crystal (CLC), is adhered to the first substrate 11. The circular polarizer 21 has a third substrate 21a, an adhesive layer 21b and a cholesteric liquid crystal (CLC) layer 21c. The cholesteric liquid crystal (CLC) layer 21c is adhered to the third substrate 21a by the adhesive layer 21b. A diffusive film 31 is formed on the second substrate 14 in order to diffuse light. A retardation layer 32 and a linear polarizer 33 are sequentially formed on the diffusive film 31. A back light 40 is disposed under the circular polarizer 21. The back light 40 has a light guide panel 41 and a lamp 42 that is at one side of the light guide panel 41. The back light 40 desirably has a high collimating pattern. The light irradiated from the back light 40 is circularly polarized when it passes through the circular polarizer 21, and then only partially circularly polarized light is transmitted by selective reflection and transmission when it passes through the cholesteric liquid crystal (CLC) color filter 12. Because partially reflected light is reflected again by many layers under the cholesteric liquid crystal (CLC) color filter 12 and then transmits through the liquid crystal cell, the light usage efficiency is improved. A color shift problem of the cholesteric liquid crystal (CLC) display device can be overcome if collimated light is used for the incident light. Because the collimated incident light can be diffused by disposing the diffusive film 31 on the liquid crystal cell, the luminance of the liquid crystal display (LCD) device can be increased.

As described above, the circular polarizer 21 is formed by adhering the cholesteric liquid crystal (CLC) layer 21c on the separate third substrate 21a using adhesive layer 21b and the circular polarizer 21 is adhered to the first substrate 11 using an another adhesive layer 22. Thickness of the third substrate 21a is between about 40 $\mu$m and 80 $\mu$m, the cholesteric liquid crystal (CLC) layer 21c is about 10 $\mu$m and the adhesive layers 21b and 22 is between about 10 $\mu$m and 20 $\mu$m. Accordingly, the thickness of the liquid crystal display (LCD) device becomes thick. Furthermore, light leakage occurs in the third substrate 21a and the adhesive layer 21b and 22, resulting in a decrease in luminance.

SUMMARY OF THE INVENTION

Accordingly, the present invention is directed to cholesteric liquid crystal (CLC) display device and manufacturing method for the same that substantially obviates one or more of problems due to limitations and disadvantages of the related art.

An advantage of the present invention is to provide the cholesteric liquid crystal (CLC) display device in which a circular polarizer is formed in an interior of liquid crystal cell in order to reduce thickness of the cholesteric liquid crystal (CLC) display device and increase a luminance by preventing a light leakage.

Another advantage of the present invention is to provide a manufacturing method of the cholesteric liquid crystal (CLC) display device in which a circular polarizer is formed in an interior of liquid crystal cell in order to reduce thickness of the cholesteric liquid crystal (CLC) display device and increase luminance by preventing light leakage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a cholesteric liquid crystal (CLC) display device includes a first substrate, a circular polarizer on the first substrate, a cholesteric liquid crystal (CLC) color filter on the circular polarizer, a first electrode on the cholesteric liquid crystal (CLC) color filter, a second substrate spaced apart from the first substrate, a second electrode beneath the second substrate, a liquid crystal layer between the first and second electrodes, a back light under the first substrate, a diffusive film on the second substrate, a retardation layer on the diffusive film, and a linear polarizer on the retardation layer. The circular polarizer is formed of cholesteric liquid crystal (CLC) material. The cholesteric liquid crystal (CLC) color filter has a dual layer structure wherein each layer has a different helical pitch. The cholesteric liquid crystal (CLC) display device may further comprise an absorptive color filter on the cholesteric liquid crystal (CLC) color filter. The diffusive film may be formed of holographic film.

A cholesteric liquid crystal (CLC) display device includes a first substrate, a circular polarizer on the first substrate, a cholesteric liquid crystal (CLC) color filter on the circular polarizer, a first electrode on the cholesteric liquid crystal (CLC) color filter, a second substrate spaced apart from the first substrate, a linear polarizer beneath the second substrate, a retardation layer beneath the linear polarizer, a second electrode beneath the retardation layer, a liquid crystal layer between the first and second electrodes, a back light under the first substrate, and a diffusive film on the second substrate. The cholesteric liquid crystal (CLC) display device may further include an overcoat layer between the linear polarizer and the retardation layer. The circular polarizer is formed of cholesteric liquid crystal (CLC) material. The cholesteric liquid crystal (CLC) color filter has a dual layer structure wherein each layer has a different helical pitch. The cholesteric liquid crystal (CLC) display device may further comprise an absorptive color filter on the cholesteric liquid crystal (CLC) color filter. The diffusive film may be formed of holographic film.

A manufacturing method of a cholesteric liquid crystal (CLC) display device comprises forming a circular polarizer on a first substrate, forming a cholesteric liquid crystal (CLC) color filter on the circular polarizer, forming a first electrode on the cholesteric liquid crystal (CLC) color filter, forming a second electrode on a second substrate, aligning the first and second substrates to make the first and second electrodes face each other and spaced apart from each other, forming a liquid crystal cell by injecting liquid crystal between the first and second electrodes, forming a diffusive film on the liquid crystal cell, forming a retardation layer on the diffusive film, forming a linear polarizer on the retardation layer, and disposing a back light under the liquid crystal cell. The circular polarizer is formed of cholesteric liquid crystal (CLC) material. The cholesteric liquid crystal (CLC) color filter has a dual layer structure wherein each layer has a different helical pitch. The diffusive film may be formed of holographic film. A manufacturing method for the cholesteric liquid crystal (CLC) color filter comprises forming a first alignment layer on the first substrate, forming a first cholesteric liquid crystal (CLC) layer on the first alignment layer, color patterning the first cholesteric liquid crystal (CLC) layer into a first cholesteric liquid crystal (CLC) color filter, hardening the first cholesteric liquid crystal (CLC) color filter by irradiating ultraviolet ray onto the first cholesteric liquid crystal (CLC) color filter, exposing the first cholesteric liquid crystal (CLC) color filter to plasma, forming a second alignment layer on the first cholesteric liquid crystal (CLC) color filter, forming a second cholesteric liquid crystal (CLC) layer on the second alignment layer, color patterning the second cholesteric liquid crystal (CLC) layer into a second cholesteric liquid crystal (CLC) color filter, hardening the second cholesteric liquid crystal (CLC) color filter by irradiating ultraviolet ray onto the second cholesteric liquid crystal (CLC) color filter, and hardening the first and second cholesteric liquid crystal (CLC) color filters by applying heat to the first and second cholesteric liquid crystal (CLC) color filter. The plasma treatment is performed using one of oxygen gas, hydrogen gas and argon gas. The manufacturing method for the cholesteric liquid crystal (CLC) display device may further comprise forming an absorptive color filter on the cholesteric liquid crystal (CLC) color filter.

A manufacturing method of a cholesteric liquid crystal (CLC) display device comprises forming a circular polarizer on a first substrate, forming a cholesteric liquid crystal (CLC) color filter on the circular polarizer, forming a first electrode on the cholesteric liquid crystal (CLC) color filter, forming a linear polarizer on a second substrate, forming a retardation layer on the linear polarizer, forming a second electrode on the retardation layer, aligning the first and second substrates to make the first and second electrodes face each other and spaced apart from each other, forming a liquid crystal cell by injecting liquid crystal between the first and second electrodes, forming a diffusive film on the liquid crystal cell, and disposing a back light under the liquid crystal cell. The cholesteric liquid crystal (CLC) display device may further comprise forming an overcoat layer between the linear polarizer and the retardation layer. The circular polarizer is formed of cholesteric liquid crystal (CLC) material. The cholesteric liquid crystal (CLC) color filter has a dual layer structure wherein each layer has a different helical pitch. The diffusive film may be formed of holographic film. A manufacturing method for the cholesteric liquid crystal (CLC) color filter comprises forming a first alignment layer on the first substrate, forming a first cholesteric liquid crystal (CLC) layer on the first alignment layer, color patterning the first cholesteric liquid crystal (CLC) layer into a first cholesteric liquid crystal (CLC) color filter, hardening the first cholesteric liquid crystal (CLC) color filter by irradiating ultraviolet ray onto the first cholesteric liquid crystal (CLC) color filter, exposing the first cholesteric liquid crystal (CLC) color filter to plasma, forming a second alignment layer on the first cholesteric liquid crystal (CLC) color filter, forming a second cholesteric liquid crystal (CLC) layer on the second alignment layer, color patterning the second cholesteric liquid crystal (CLC) layer into a second cholesteric liquid crystal (CLC) color filter, hardening the second cholesteric liquid crystal (CLC) color filter by irradiating ultraviolet ray onto the second cholesteric liquid crystal (CLC) color filter, and hardening the first and second cholesteric liquid crystal (CLC) color filters by applying heat to the first and second cholesteric liquid crystal (CLC) color filter. The plasma treatment is performed using one of oxygen gas, hydrogen gas and argon gas. The manufacturing method for the cholesteric liquid crystal (CLC) display device may further comprise forming an absorptive color filter on the cholesteric liquid crystal (CLC) color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 2:
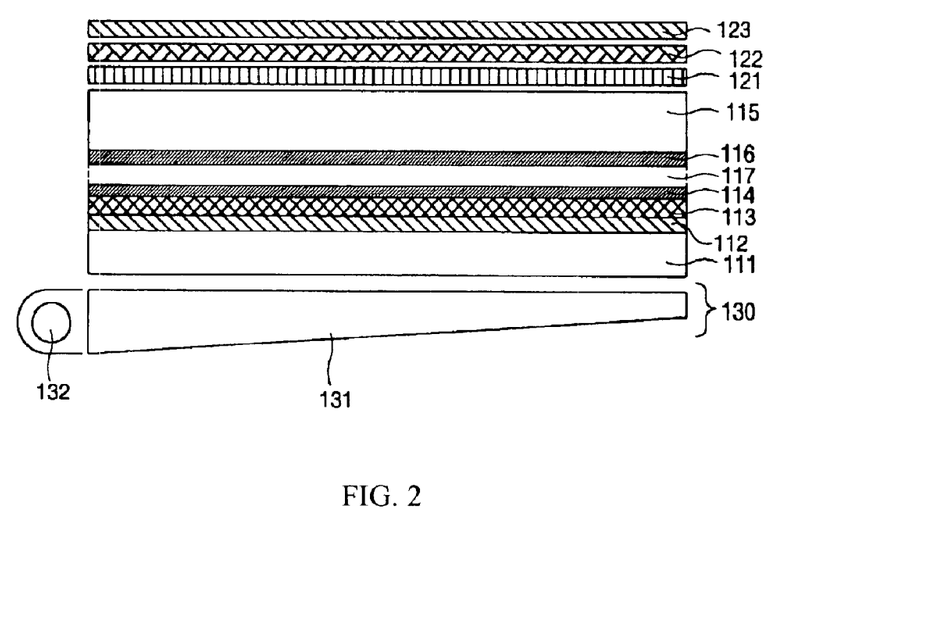
FIG. 2 is a cross-sectional view of a first embodiment of the present invention.

FIG. 2 is a cross-sectional view of a first embodiment of the present invention. In FIG. 2, a circular polarizer 112 is formed on a first substrate 111, and a cholesteric liquid crystal (CLC) color filter 113 is formed on the circular polarizer 112. A first electrode 114 is then formed on the cholesteric liquid crystal (CLC) color filter 113. The first substrate 111 is formed of transparent insulating material such as glass, and the first electrode 114 is formed of transparent conductive metal material such as indium tin oxide (ITO). The circular polarizer 112 is formed of cholesteric liquid crystal (CLC). The cholesteric liquid crystal (CLC) has a selective reflection property. That is, the cholesteric liquid crystal (CLC) reflects only incident light of a particular wavelength according to a helical pitch of a cholesteric liquid crystal (CLC) helix. The polarization state of the reflected light depends on a rotational direction of the cholesteric liquid crystal (CLC). For example, left-handed cholesteric liquid crystal reflects a left circularly polarized light that has a wavelength corresponding to the pitch of the left-handed cholesteric liquid crystal. That is, a direction of a circular polarization of the reflected light depends on whether the helix structure of the cholesteric liquid crystal is right-handed or left-handed.

A second substrate 115 is spaced apart from the first substrate 111 and a transparent second electrode 116 is formed beneath the second substrate 115. The second substrate 115 is also formed of transparent insulating material and the second electrode is also formed of transparent conductive metal material such as indium tin oxide (ITO). Liquid crystal layer 117 is disposed between the first and second electrodes 114 and 116. Although not shown in FIG. 2, an alignment layer is further formed on the first electrode 114 and beneath the second electrode 116 in order to initially align the liquid crystal molecules. The alignment of the liquid crystal molecules is changed by an electric field that is generated between the first and second electrodes 114 and 116 when voltage is applied to the first and second electrodes 114 and 116. A diffusive film 121, a retardation layer 122 and a linear polarizer 123 are sequentially formed on the second substrate 115. The diffusive film 121 is for diffusing light and the retardation layer 122 changes linearly polarized light into circularly polarized light and circularly polarized light into linearly polarized light. The linear polarizer 123 transmits only light that is parallel to a light transmission axis. The diffusive film 121 may be formed of holographic film or diffusive sheet. The diffusive function may be incorporated into the linear polarizer as a unit. However, it desirable to form the diffusive film 121 with the holographic film. A back light 130 is disposed under the first substrate 111. The back light 130 has a light guide panel 131 and a lamp 132 on one side of the light guide panel 131. The back light 130 desirably has high collimated pattern. In the liquid crystal cell according to the first embodiment of the present invention, the circular polarizer 112 is formed directly on the first substrate 111 and thus a separate adhesive layer and a substrate are unnecessary. Accordingly, the thickness of the cholesteric liquid crystal (CLC) display device can be reduced by between about 50 µm and about 100 µm compared to the related art cholesteric liquid crystal (CLC) display device that has the circular polarizer in an exterior of the liquid crystal cell. In addition to that, production cost can be decreased because there is a reduction in the number of manufacturing steps, and the luminance can be improved by reducing the light leakage. The cholesteric liquid crystal (CLC) color filter 113 is desirably formed to have a dual layer structure.

Figure 3:
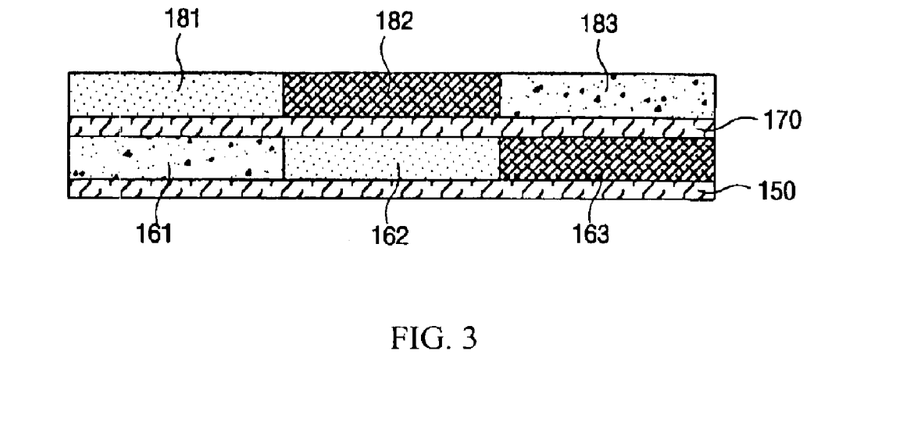
FIG. 3 is a cross-sectional view of a color filter according to the first embodiment of the present invention.

FIG. 3 is a cross-sectional view of a color filter according to the first embodiment of the present invention. In FIG. 3, the cholesteric liquid crystal (CLC) color filter has a first cholesteric liquid crystal (CLC) color filter 161, 162 and 163 on a first alignment layer 150 and a second cholesteric liquid crystal (CLC) color filter 181, 182 and 183 on a second alignment layer 170. The first cholesteric liquid crystal (CLC) color filter has sub-color filters that correspond to each pixel and the second cholesteric liquid crystal (CLC) color filter has sub-color filters that correspond to each pixel. The second alignment layer 170 is formed on the first cholesteric liquid crystal (CLC) color filter 161, 162 and 163. As stated before, the cholesteric liquid crystal (CLC) color filter has a selective reflection property, and the selective reflection depends on a helical pitch of the cholesteric liquid crystal (CLC) molecules. Accordingly, the transmitted light can respectively display red, green and blue colors by forming two layers having a different helical pitch on each pixel region. If the first sub-color filter of a first cholesteric liquid crystal (CLC) color filter reflects light in a wavelength range of red color and the first sub-color filter of the second cholesteric liquid crystal (CLC) color filter reflects light in a wavelength range of green color, light in a wavelength range of green color and blue color can transmit through the first sub-color filter of the first cholesteric liquid crystal (CLC) color filter. The light in a wavelength range of green color is subsequently reflected when it is incident upon the first sub-color filter of the second cholesteric liquid crystal (CLC) color filter, and the light in a wavelength range of blue color is subsequently transmitted when it is incident upon the first sub-color filter of the second cholesteric liquid crystal (CLC) color filter. Accordingly, only the blue color is displayed in the pixel region corresponding to the first sub-color filters. The reflection wavelength range of the cholesteric liquid crystal (CLC) color filter can be controlled by varying the helical pitch of the cholesteric liquid crystal (CLC) molecules.

Figure 4A:
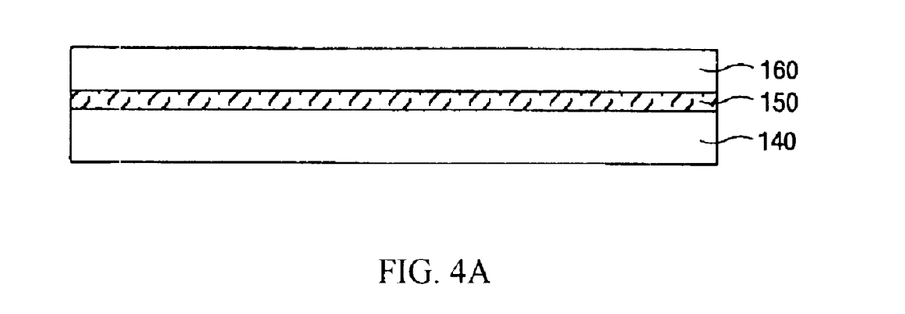
FIGS. 4A to 4E are cross-sectional views illustrating a manufacturing sequence of the color filter according to the first embodiment of the present invention.

FIGS. 4A to 4E are cross-sectional views illustrating a manufacturing sequence of the color filter according to the first embodiment of the present invention. In FIG. 4A, the first alignment layer 150 is formed on a substrate 140, and a surface of the first alignment layer 150 is aligned by rubbing or light alignment method. Thereafter, a first cholesteric liquid crystal (CLC) layer 160 is formed by coating cholesteric liquid crystal (CLC) material on the first alignment layer 150. The substrate 140 here is the first substrate 111 of FIG. 2 on which the circular polarizer 112 is formed.

Figure 4B:
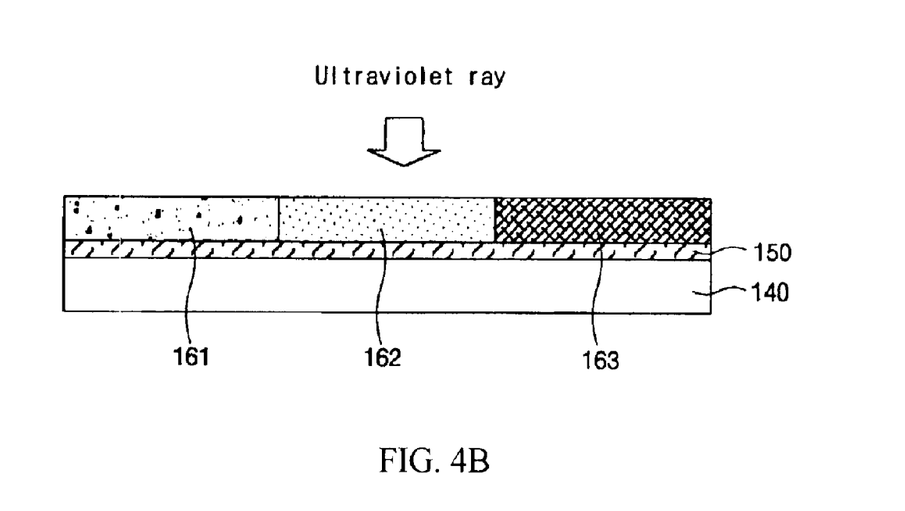

In FIG. 4B, the first cholesteric liquid crystal (CLC) color filter 161, 162 and 163 is formed by irradiating ultraviolet light onto the first cholesteric liquid crystal (CLC) layer 160 and then hardening the first cholesteric liquid crystal (CLC) layer 160 using ultraviolet light. The irradiation of the ultraviolet light onto the cholesteric liquid crystal (CLC) layer 160 is referred to as a color patterning by which each pixel region obtains a different helical pitch.

Figure 4C:
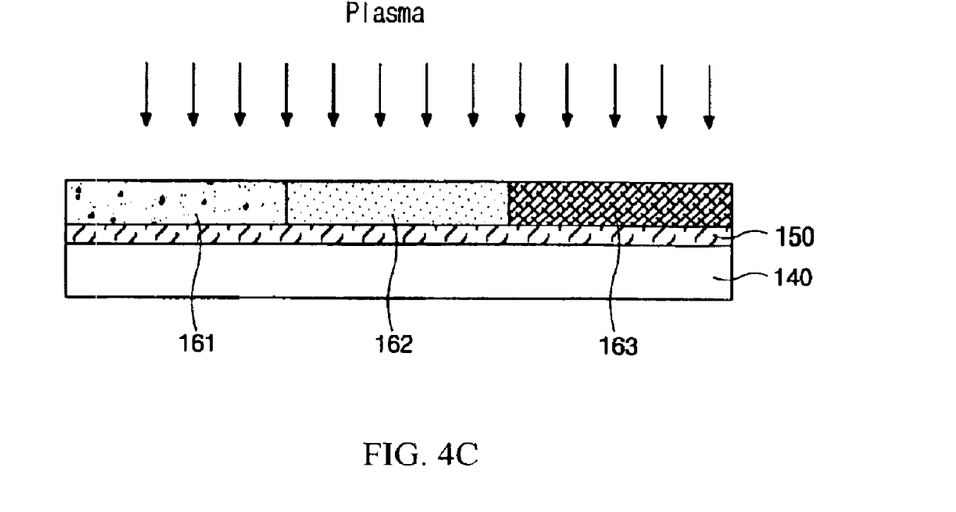

In FIG. 4C, surfaces of the first cholesteric liquid crystal (CLC) color filter 161, 162 and 163 are treated using plasma. The plasma treatment is performed to allow uniform coating of a second alignment layer 170 on the first cholesteric liquid crystal (CLC) color filter 161, 162, and 163 in a later process by increasing a surface tension of the first cholesteric liquid crystal (CLC) color filter 161, 162 and 163. Oxygen gas, hydrogen gas, argon gas or a mixture of these gases may be used for the plasma treatment. It is desirable to use hydrogen gas or gas that has a high hydrogen content for the plasma treatment because such gases do not affect the first cholesteric liquid crystal (CLC) color filter 161, 162, and 163 and improve the coating quality of the second alignment layer 170.

Figure 4D:
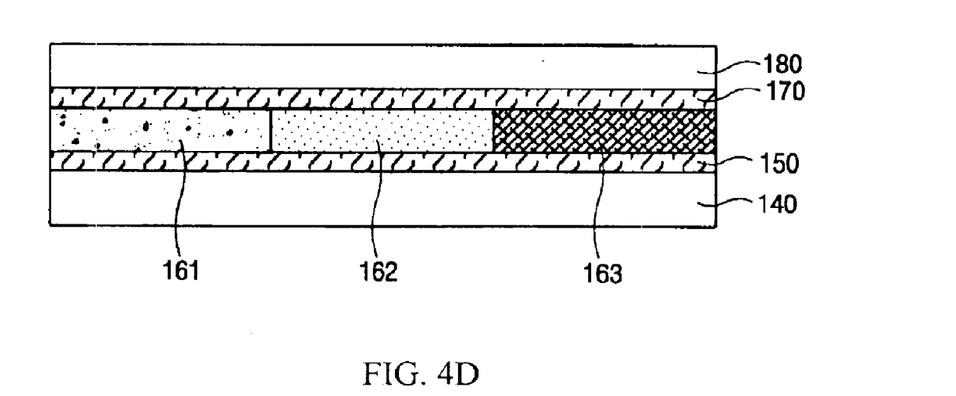

In FIG. 4D, the second alignment layer 170 is formed on the first cholesteric liquid crystal (CLC) color filter 161, 162 and 163. Then the surface of the second alignment layer 170 is aligned by a rubbing or a light alignment method. A second cholesteric liquid crystal (CLC) layer 180 is subsequently formed by coating the cholesteric liquid crystal (CLC) material on the second alignment layer 170.

Figure 4E:
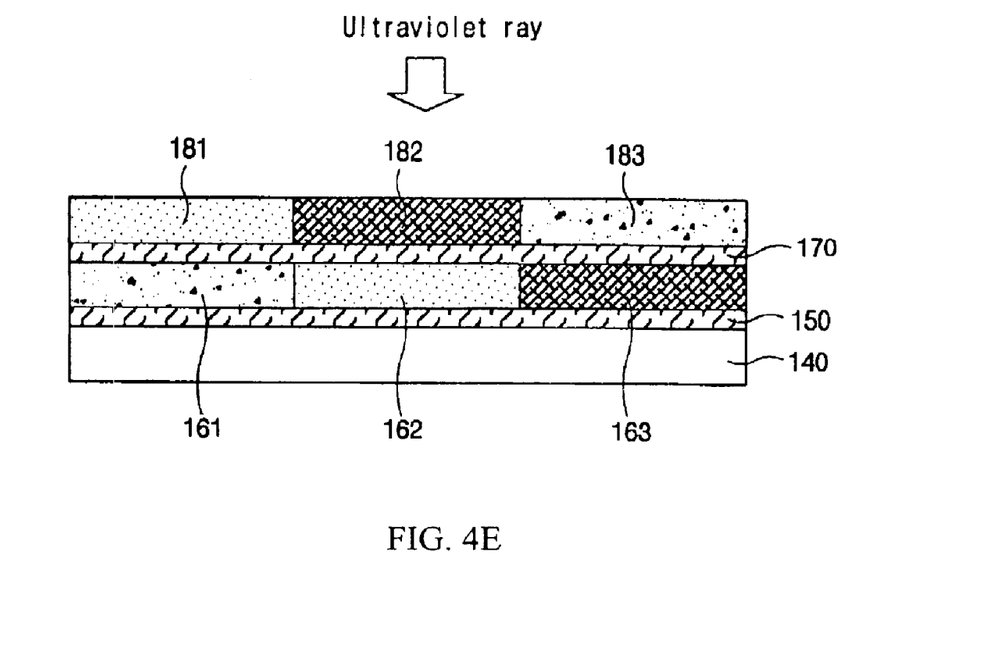

In FIG. 4E, a color patterning is performed with respect to the second cholesteric liquid crystal (CLC) layer 180 of FIG. 4D by irradiating ultraviolet light onto the second cholesteric liquid crystal (CLC) layer 180 to make each pixel region have a different helical pitch. The second cholesteric liquid crystal (CLC) color filter 181, 182, and 183 is then formed by hardening the second cholesteric liquid crystal (CLC) layer 180 using ultraviolet light. The helical pitch of each pixel of the second cholesteric liquid crystal (CLC) color filter 181, 182 and 183 is different from the helical pitch of each pixel of the first cholesteric liquid crystal (CLC) color filter 161, 162 and 163. A heat treatment may then be performed to harden completely the first cholesteric liquid crystal (CLC) color filter 161, 162 and 163 and the second cholesteric liquid crystal (CLC) color filter 181, 182 and 183. The first electrode 114 of FIG. 2 is formed on the second cholesteric liquid crystal (CLC) color filter 181, 182 and 183 and the second electrode 116 of FIG. 2 is formed beneath the second substrate 115. The liquid crystal layer 117 of FIG. 2 is formed by injecting liquid crystal, which may be a cholesteric liquid crystal, between the first and second substrates 111 and 115. The liquid crystal cell is thus completed by these processes. An absorptive color filter may further be formed on the second cholesteric liquid crystal (CLC) color filter 181, 182 and 183 to improve a color display by facilitating an optimization of a color coordinate.

Figure 5:
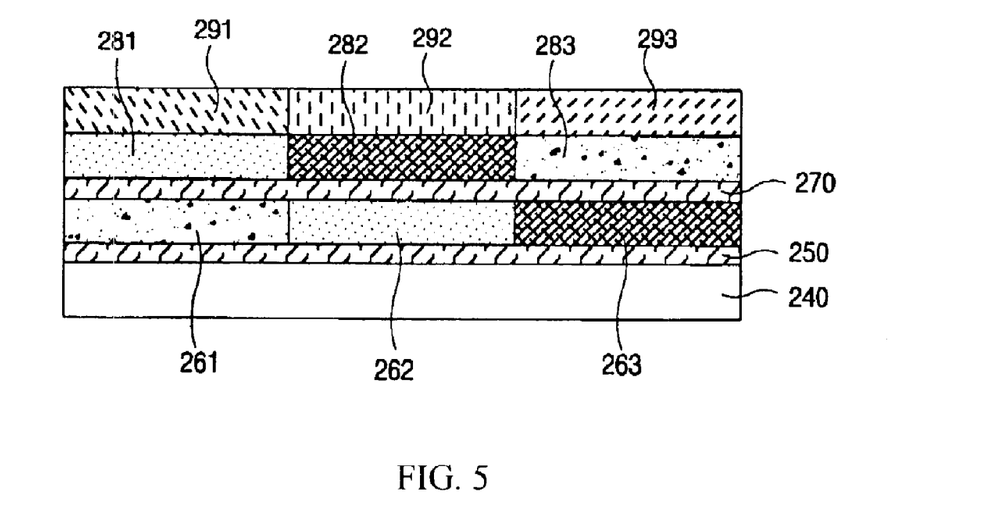
FIG. 5 is a cross-sectional view of a color filter according to a second embodiment of the present invention.

FIG. 5 is a cross-sectional view of a color filter according to a second embodiment of the present invention. The second embodiment of the present invention is same as the first embodiment of the present invention except for the cholesteric liquid crystal (CLC) color filter. Accordingly, only a cholesteric liquid crystal (CLC) color filter is illustrated in FIG. 5. In FIG. 5, a first alignment layer 250 is formed on a substrate 240. A first cholesteric liquid crystal (CLC) color filter 261, 262 and 263 is formed on the first alignment layer 250 and a second alignment layer 270 is then formed on the first cholesteric liquid crystal (CLC) color filter 261, 262 and 263. The first cholesteric liquid crystal (CLC) color filter has sub-color filters that correspond to each pixel. A second cholesteric liquid crystal (CLC) color filter 281, 282 and 283 is formed on the second alignment layer 270. The second cholesteric liquid crystal (CLC) color filter has sub-color filters that correspond to each pixel. An absorptive color filter 291, 292 and 293 is then formed on the second cholesteric liquid crystal (CLC) color filter 281, 282 and 283. The absorptive color filter has sub-color filters that correspond to each pixel. The first cholesteric liquid crystal (CLC) color filter 261, 262 and 263 and the second cholesteric liquid crystal (CLC) color filter 281, 282 and 283 are formed to reflect light of a different wavelength range in each pixel. The absorptive color filter 291, 292 and 293 transmits light that passes through the second cholesteric liquid crystal (CLC) color filter 281, 282 and 283 in each pixel and absorbs other light. If the first sub-color filter of the first cholesteric liquid crystal (CLC) color filter reflects light of a wavelength range for red color and a sub-color filter of the second cholesteric liquid crystal (CLC) color filter reflects light of a wavelength range for green color, the light the wavelength range for green and blue colors, which passed through the first sub-color filter of the first cholesteric liquid crystal (CLC) color filter, are incident upon the first sub-color filter of the second cholesteric liquid crystal (CLC) color filter, and only the light of wavelength range for blue color can be transmitted through the first sub-color filter of the second cholesteric liquid crystal (CLC) color filter. At this time, a first sub-color filter of an absorptive color filter absorbs light in a wavelength range for colors other than blue color, and thus blue color can be displayed. Other sub-color filters of the first cholesteric liquid crystal (CLC) color filter and sub-color filters of the second cholesteric liquid crystal (CLC) color filter, which are for displaying other colors, can be formed using the same technique as the first sub-color filters of the first and second cholesteric liquid crystal (CLC) color filters. Accordingly, the red, green and blue colors can be sequentially displayed. A manufacturing process of the first and second cholesteric liquid crystal (CLC) color filters of the second embodiment is the same as that of the first embodiment. The absorptive color filter 291, 292 and 293 may be formed on the second cholesteric liquid crystal (CLC) color filter 281, 282 and 283 using, for example, a pigment spraying method, an inkjet printing method or a film transcription method. The absorptive color filter 291, 292 and 293 may be formed after a surface of the second cholesteric liquid crystal (CLC) color filter 281, 282 and 283 is treated using plasma. While the retardation layer 122 and the linear polarizer 123 are formed on the second substrate 115 of FIG. 2, they may be formed in an interior portion of the liquid crystal cell to further reduce the thickness of the cholesteric liquid crystal (CLC) display device.

Figure 6:
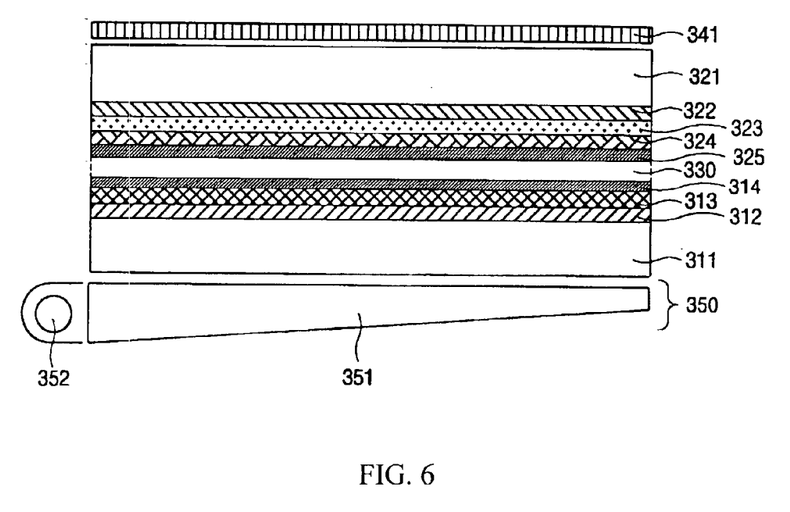
FIG. 6 is a cross-sectional view of a third embodiment of the present invention.

FIG. 6 is a cross-sectional view of a third embodiment of the present invention. In FIG. 6, a circular polarizer 312 is formed on a transparent substrate 311, and a color filter 313 is formed on the circular polarizer 312. A first electrode 314 is then formed on the cholesteric liquid crystal (CLC) color filter 313. The circular polarizer 312 is formed of cholesteric liquid crystal (CLC). The color filter 313 may be formed only of the cholesteric liquid crystal (CLC) color filter or it may be formed of the cholesteric liquid crystal (CLC) color filter together with an absorptive color filter. The cholesteric liquid crystal (CLC) color filter is desirably formed to have a dual layer structure in which each layer has a different helical pitch. A second substrate 321 is spaced apart from the first substrate 311. A linear polarizer 322 is formed beneath the second substrate 321. An overcoat layer 323 is formed beneath the linear polarizer 322, and a retardation layer 324 and a second electrode 325 are sequentially formed under the linear polarizer 322. The second substrate 321 is formed of transparent insulating material, such as glass. The second electrode 325 is formed of transparent conductive metal material, such as indium tin oxide (ITO). An alignment layer may further be formed between the overcoat layer 323 and the retardation layer 324. Liquid crystal layer 330 is formed between the first and second electrode 314 and 325. Alignment layers (not shown in the figure) are further formed respectively on the first electrode 314 and beneath the second electrode 325 to align liquid crystal molecules of the liquid crystal layer 330, which maybe a cholesteric liquid crystal (CLC) layer. A diffusive film 341 is formed on the second substrate 321 to diffuse light. A back light 350 is disposed under the first substrate 311. The back light 350 has a light guide panel 351 and a lamp 352 at one side of the light guide panel 351. The back light 350 desirably has a high collimating pattern.

Figure 7A:
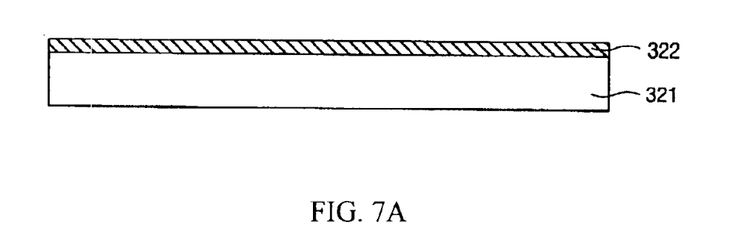
FIGS. 7A to 7C are cross-sectional views illustrating a manufacturing sequence of an upper substrate of a cholesteric liquid crystal (CLC) display device according to the third embodiment of the present invention.
Figure 7B:
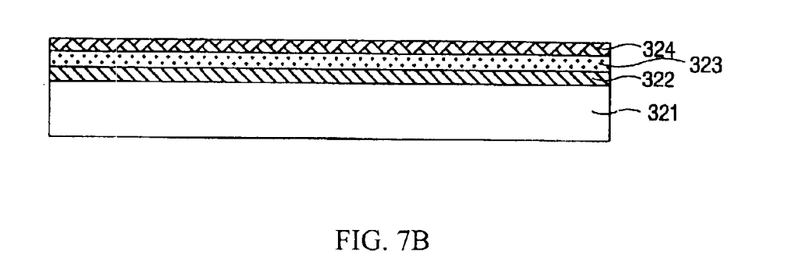
Figure 7C:
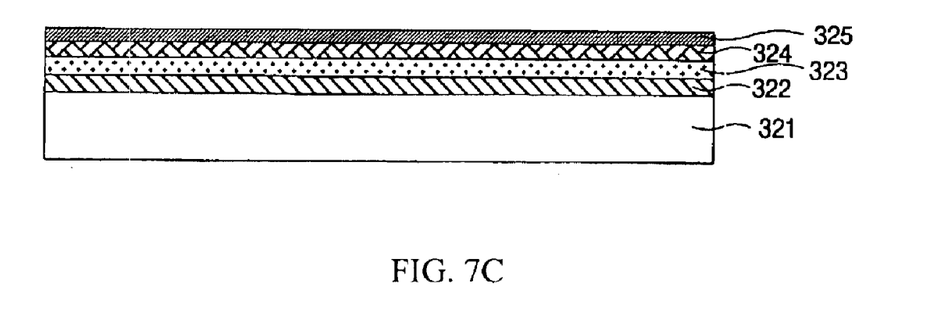

FIGS. 7A to 7C are cross-sectional views illustrating a manufacturing sequence of an upper substrate of a cholesteric liquid crystal (CLC) display device according to the third embodiment of the present invention. In FIG. 7A, the linear polarizer 322 is formed on the second substrate 321. The linear polarizer 322 may be formed by coating and drying lyotropic liquid crystal that is in aqueous solution state.

In FIG. 7B, the overcoat layer 323 is formed on the linear polarizer 322 and the retardation layer 324 is subsequently formed on the overcoat layer 323. The retardation layer 324 has a phase difference of about λ/4 and has a thickness under about 2 micrometers (μm). If liquid crystal is used for the retardation layer 324, it is desirable to use liquid crystal material that has a high index of birefringence and further form the alignment layer under the retardation layer 324. The overcoat layer 323 may be omitted.

In FIG. 7C, the second electrode 325 is formed by depositing transparent conductive metal material such as indium tin oxide (ITO) on the retardation layer 324. As described above, the retardation layer 324 and the linear polarizer 322 are fanned in the interior of the liquid crystal cell, and consequently the thickness and manufacturing cost of the cholesteric liquid crystal (CLC) display device can be further reduced.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A cholesteric liquid crystal (CLC) display device, comprising:
    a first substrate;
    a circular polarizer on the first substrate;
    a cholesteric liquid crystal (CLC) color filter on the circular polarizer;
    a first electrode on the cholesteric liquid crystal (CLC) color filter;
    a second substrate spaced apart from the first substrate;
    a second electrode beneath the second substrate;
    a liquid crystal layer between the first and second electrodes;
    a back light under the first substrate;
    a diffusive film on the second substrate;
    a retardation layer on the diffusive film; and
    a linear polarizer on the retardation layer.

2. The device according to claim 1, wherein the circular polarizer is formed of cholesteric liquid crystal (CLC) material.

3. The device according to claim 1, wherein the cholesteric liquid crystal (CLC) color filter has a dual layer structure wherein each layer has a different helical pitch.

4. The device according to claim 1, further comprises an absorptive color filter on the cholesteric liquid crystal (CLC) color filter.

5. The device according to claim 1, wherein the diffusive film is formed of holographic film.

6. A cholesteric liquid crystal (CLC) display device, comprising:
    a first substrate;
    a circular polarizer on the first substrate;
    a cholesteric liquid crystal (CLC) color filter on the circular polarizer;
    a first electrode on the cholesteric liquid crystal (CLC) color filter;
    a second substrate spaced apart from the first substrate;
    a linear polarizer beneath the second substrate;
    a retardation layer beneath the linear polarizer;
    a second electrode beneath the retardation layer;
    a liquid crystal layer between the first and second electrodes;
    a back light under the first substrate; and a diffusive film on the second substrate.

7. The device according to claim 6, further comprises an overcoat layer between the linear polarizer and the retardation layer.

8. The device according to claim 6, wherein the circular polarizer is formed of cholesteric liquid crystal (CLC) material.

9. The device according to claim 6, wherein the cholesteric liquid crystal (CLC) color filter has a dual layer structure wherein each layer has a different helical pitch.

10. The device according to claim 6, further comprises an absorptive color filter on the cholesteric liquid crystal (CLC) color filter.

11. The device according to claim 6, wherein the diffusive film is formed of holographic film.

12. A manufacturing method of a cholesteric liquid crystal (CLC) display device, comprising:
    forming a circular polarizer on a first substrate;
    forming a cholesteric liquid crystal (CLC) color filter on the circular polarizer;
    forming a first electrode on the cholesteric liquid crystal (CLC) color filter;
    forming a second electrode on a second substrate;
    aligning the first and second substrates to make the first and second electrodes face each other and be spaced apart from each other;
    injecting liquid crystal between the first and second electrodes;
    forming a diffusive film on the liquid crystal cell;
    forming a retardation layer on the diffusive film;
    forming a linear polarizer on the retardation layer; and
    disposing a back light under the liquid crystal cell.

13. The method according to claim 12, wherein the circular polarizer is formed of cholesteric liquid crystal (CLC) material.

14. The method according to claim 12, wherein the cholesteric liquid crystal (CLC) color filter has a dual layer structure wherein each layer has a different helical pitch.

15. The method according to claim 12, wherein the diffusive film may be formed of holographic film.

16. The method according to claim 12, wherein a manufacturing method for the cholesteric liquid crystal (CLC) color filter comprises:
    forming a first alignment layer over the first substrate;
    forming a first cholesteric liquid crystal (CLC) layer on the first alignment layer;
    color patterning the first cholesteric liquid crystal (CLC) layer into a first cholesteric liquid crystal (CLC) color filter;
    hardening the first cholesteric liquid crystal (CLC) color filter by irradiating ultraviolet light onto the first cholesteric liquid crystal (CLC) color filter;
    exposing the first cholesteric liquid crystal (CLC) color filter to plasma;
    forming a second alignment layer on the first cholesteric liquid crystal (CLC) color filter;
    forming a second cholesteric liquid crystal (CLC) layer on the second alignment layer;
    color patterning the second cholesteric liquid crystal (CLC) layer into a second cholesteric liquid crystal (CLC) color filter; and
    hardening the second cholesteric liquid crystal (CLC) color filter by irradiating ultraviolet light onto the second cholesteric liquid crystal (CLC) color filter.

17. The method according claim 16, further comprising hardening the first and second cholesteric liquid crystal (CLC) color filters by applying heat to the first and second cholesteric liquid crystal (CLC) color filter.

18. The method according to claim 16, wherein the plasma treatment is performed using one of oxygen gas, hydrogen gas and argon gas.

19. The method according to claim 12, further comprising forming an absorptive color filter on the cholesteric liquid crystal (CLC) color filter.

20. A manufacturing method of a cholesteric liquid crystal (CLC) display device, comprising:
    forming a circular polarizer on a first substrate;
    forming a cholesteric liquid crystal (CLC) color filter on the circular polarizer;
    forming a first electrode on the cholesteric liquid crystal (CLC) color filter;
    forming a linear polarizer on a second substrate;
    forming a retardation layer on the linear polarizer; forming a second electrode on the retardation layer;
    aligning the first and second substrates to make the first and second electrodes face each other and be spaced apart from each other;
    injecting liquid crystal between the first and second electrodes;
    forming a diffusive film on the liquid crystal cell; and
    disposing a back light under the liquid crystal cell.

21. The method according to claim 20, further comprising forming an overcoat layer between the linear polarizer and the retardation layer.

22. The method according to claim 20, wherein the circular polarizer is formed of cholesteric liquid crystal (CLC) material.

23. The method according to claim 20, wherein the cholesteric liquid crystal (CLC) color filter has a dual layer structure wherein each layer has a different helical pitch.

24. The method according to claim 20, wherein the diffusive film is formed of holographic film.

25. The method according to claim 20, wherein a manufacturing method for the cholesteric liquid crystal (CLC) color filter comprises:
    forming a first alignment layer over the first substrate;
    forming a first cholesteric liquid crystal (CLC) layer on the first alignment layer;
    color patterning the first cholesteric liquid crystal (CLC) layer into a first cholesteric liquid crystal (CLC) color filter;
    hardening the first cholesteric liquid crystal (CLC) color filter by irradiating ultraviolet light onto the first cholesteric liquid crystal (CLC) color filter;
    exposing the first cholesteric liquid crystal (CLC) color filter to plasma;
    forming a second alignment layer on the first cholesteric liquid crystal (CLC) color filter;
    forming a second cholesteric liquid crystal (CLC) layer on the second alignment layer;
    color patterning the second cholesteric liquid crystal (CLC) layer into a second cholesteric liquid crystal (CLC) color filter; and
    hardening the second cholesteric liquid crystal (CLC) color filter by irradiating ultraviolet light onto the second cholesteric liquid crystal (CLC) color filter.

26. The method according to claim 25, further comprising hardening the first and second cholesteric liquid crystal (CLC) color filters by applying heat to the first and second cholesteric liquid crystal (CLC) color filter.

27. The method according to claim 25, wherein the plasma treatment is performed using one of oxygen gas, hydrogen gas and argon gas.

28. The method according to claim 20, further comprises forming an absorptive color filter on the cholesteric liquid crystal (CLC) color filter.

29. A liquid crystal display device, comprising:
 a first substrate;
 a circular polarizer on the first substrate;
 a cholesteric liquid crystal (CLC) color filter on the circular polarizer, wherein the circular polarizer is between the first substrate and the CLC color filter;
 a first electrode on the cholesteric liquid crystal (CLC) color filter;
 a second substrate spaced apart from the first substrate;
 a second electrode beneath the second substrate;
 a liquid crystal layer between the first and second electrodes; and
 a back light under the first substrate.

* * * * *